Patented Jan. 2, 1934

UNITED STATES PATENT OFFICE 1,941,506

PROCESS FOR RECOVERING NONFERROUS METALS FROM MELTS CONTAINING METAL OXIDES

Wilhelm Witter, Halle, Germany, assignor to Firma M. Lissauer & Cie, Cologne-on-the-Rhine, Germany No Drawing. Application December 5, 1930, Serial No. 500,165, and in Germany December 27, 1929

7 Claims. (Cl. 75—17)

This invention relates to a process for recovering non-ferrous metals from molten materials containing metal oxides, such as slags, melts or the like whilst employing reducing gases, such as for example, water-gas, illuminating gas or carbon monoxide.

Repeated attempts have been made to treat such molten materials with reducing gases for the purpose of recovering metal therefrom, but up to the present none of these proposals have found application on an industrial scale.

I have recognized that in order to recover the metal content of, for example a molten slag, in a reguline form, the successful course of the reaction, and particularly the avoidance of any re-oxidation of the separated metal, is only possible if care be taken to ensure that a reducing or at least neutral furnace atmosphere be maintained at the surface of the melt in every phase of the process. Since the reaction between the molten slag and the reducing gases is highly endothermic and the mass is strongly cooled by the relatively large amounts of the reducing gases led therethrough, it is impossible to dispense with the necessity of supplying additional heat.

This necessity of supplying additional heat, however, proved to be a source of great difficulty insofar as in an internally heated furnace the combustion gases formed exercised a strong oxidizing action upon the lively agitated molten mass thereby counteracting wholly or partly the action of the reducing gases passed through the melt.

To overcome this difficulty divers proposals have been made i. e. external heating of the container of the molten mass; furthermore dividing the process into two distinctly separated phases, the one for heating and the other for reducing; and in a further proposal it was attempted to supply the necessary heat by preheating the reducing gases passed through the melt. It has been found, however, that the amount of heat that could be thus supplied did not suffice to keep the molten mass sufficiently fluid. About double the amount of the necessary reducing gas had to be used and part of the same had to be burned in the melt by simultaneously blowing in oxygen.

In accordance with the present invention the additional heat is evolved internally by introducing the heating medium as for instance oil or gas into the interior of the furnace above the surface of the melt whereby the passing of this heating medium through the molten mass is particularly excluded.

To this effect, the nature of the combustion gases at the surface of the melt and the amount of reducing gases passed through the melt per unit period are so adjusted relatively to each other that a neutral or reducing atmosphere obtains on the surface of the melt, whereby the metal produced is obtained wholly or partly in a reguline form.

It is thus possible to separate non-ferrous metals, not only copper, nickel and the like which are not usually obtained in the volatile form but also tin, lead, antimony and the like in the form of a regulus, in a simple and economical manner.

In this respect, the process of the present invention differs fundamentally from the previously proposed processes. Thus, for example, it has already been proposed to treat molten metalliferous materials with carbon in a liquid, solid or gaseous form or with reducing gases while simultaneously blowing in air. This combination of reducing and oxidizing agents does not permit volatile metals to be obtained in the reguline form. In a further proposal, it has been specifically stated that it is possible to separate the volatile metals as reguli only in an electric furnace with the exclusion of air as they would otherwise be obtained in an oxidic form.

Although in general it is desirable to obtain metals, such as tin, lead, antimony and the like as completely as possible in the metallic form, it may nevertheless be necessary, or at least advisable, to dispense with this. As the melt becomes progressively poorer in these metals, the amounts of gas and time required increase very considerably; moreover the metal can frequently not be separated out completely. This appears to be mainly attributable to the fact that the last remnants of metal separate out in the form of minute particles which remain suspended in the melt, this suspension being assisted by the agitating action of the gases passing through the melt. It is therefore advisable to alter the operation at a given period for each metal, in such a manner that these last remnants of metal are no longer obtained in the metallic form but in the oxidic form. Instead of the reducing or neutral atmosphere maintained up to this period a distinctly oxidic furnace atmosphere must be maintained in the furnace course of the process. The corresponding oxide is then collected in known manner, for example, by bag filters. An essential advantage of this combined process, is that the molten masses can be worked up in one and the same furnace and during one and the same heating.

This method of operation is particularly advantageous in the treatment of complex melts, that is to say, melts which contain both copper, nickel or the like and also tin, lead, antimony, or the like. The operation is first carried out under reducing conditions in order in this manner to separate out the metals of the first group in the sequence of their heats of reduction and a part of those of the second group in the reguline form whereas the remainder of the metals of the second group are thereupon obtained as oxide. Advantageously the already separated metals are removed from the oxidizing influence of the furnace atmosphere prior to the commencement of the second part of the process, this removal being effected in known manner, for example, in a type of converter provided with a pocket, adapted for tapping off the first removed metals.

It has further been ascertained that the carrying out of the operation under oxidizing conditions can be extraordinarily accelerated if sulphur in a solid, fused, or vapour form be added either as such or in the form of compounds. The economy of the process is very considerably increased by this measure.

Although most of the initial materials hereinbefore set forth contain sulphur, it is nevertheless generally necessary to add sulphur or sulphur yielding substances because the sulphur contained in the slags or the like is not effective in all cases. If the necessary additions of sulphur or sulphur yielding substances are made, then all the metals the sulphur compounds of which are volatile at the temperatures coming into consideration, are driven out of the molten masses. The sulphur compounds, on further passage through the furnace then burn to oxides or sulphates and can be collected in known manner in suitable apparatus.

It has already been proposed to lead a mixture of steam and sulphuretted hydrogen at 800° C. over ores and other materials in order to sublime off tin, bismuth, molybdenum as sulphur compounds. In this process the material to be treated was in a solid form and the action of the gas mixture took place only on the surface thereof; in contradistinction to this, however in accordance with the present invention, the reducing gases are forced through a bath of liquid slag with a result that entirely different reactions are set up and entirely different results obtained. The hereindescribed process can, in effect, not be carried out with a gas mixture of the foregoing composition.

A particular method of carrying out the process consists in introducing into the molten slag, substances containing metal oxides, such as for example, flue dust or the like and subjecting the mixture to the hereindescribed treatment. In this manner not only the metal content of the slag but also that of the additional substances is recovered. When taking into consideration the difficulties encountered in the recovery of such substances in accordance with the hitherto known methods, the extraordinary saving in time of the new process immediately becomes apparent.

Naturally the invention is not restricted to the hereindescribed combined process but covers also the individual processes, namely the recovery of the metals in the reguline form with reducing or at least neutral furnace atmosphere and the recovery of the metals as volatile compounds by operating in an oxidizing atmosphere with the addition of sulphur or sulphur yielding substances.

The following examples are given for the purpose of facilitating the comprehension of the invention:

*Example 1: Recovery of copper regulus*

300 kgs. of a copper slag containing 2.5% Cu are treated at a temperature of 1300° C. with 25 cubic metres of illuminating gas and were reduced after 25 minutes to a content of 0.18% of copper, a metal regulus of about 7 kgs. by weight being obtained.

*Example 2: Recovery of a tin-regulus*

1000 kgs. of a reverberatory furnace slag containing 3.3% tin as well as small amounts of copper and lead and obtained by melting stanniferous substances with a reducing agent, was detinned at about 1350° C. with 30 cubic metres of illuminating gas within 30 minutes to a content of 0.7% tin. The regulus obtained weighed 46 kgs. and contained 53% of tin.

*Example 3: Combined process without addition of sulphur*

500 kgs. of a slag containing 9.84% Cu, 5.4% Sn, 10.8% Sb were treated for 45 minutes with 40 cubic metres of water gas at 1400° C. in a reducing atmosphere. A slag was obtained which contained traces of Cu, 0.96% Sn, 1.92% Sb. The further treatment of this slag under oxidizing conditions with 20 cubic metres of water gas gave a final slag containing 0.15% Sn and 0.30% Sb.

The importance of the addition of sulphur for the oxidizing process is illustrated by the large scale tests of the following comparative tests which show large scale operations carried out with and without such addition.

*Example 4*

| Without addition of sulphur | With addition of sulphur |
|---|---|
| Test I | Test II |
| Charge 250 kgs. of plumbiferous slag containing 2.88% Pb | Charge 250 kgs. of plumbiferous slag containing 3.13% Pb |
| After 30 minutes the slag still contained 0.92% Pb | After 20 minutes blowing the slag contained 0.46% |
| After 45 minutes the slag still contained 0.46% Pb | After 30 minutes' blowing the slag contained 0.10%. |
| After 60 minutes the slag still contained 0.44% Pb | Temperature of the bath 1400% C. |
| Temperature of the bath 1400° C. | |
| Test III | Test IV |
| Charge 300 kgs. rich reverberatory furnace slag containing about 5% Sn | Charge 300 kgs. reverberatory furnace slag as in Test III, |
| After 1 hour's blowing the slag contained 1.60% Sn | After 30 minutes' blowing the slag contained 1.80% Sn |
| After 1½ hours' blowing the slag contained 0.80% Sn | After 75 minutes' blowing the slag contained 0.15% Sn |
| After 2 hours' blowing the slag contained 0.60% Sn | Temperature of the bath 1400° C. |
| Temperature of the bath 1400° C. | |

The last example shows the action of the addition of flue dust or similar materials.

*Example 5*

To 300 kgs. of shaft furnace slag containing 5.8% Sn are added 50 kgs. of a shaft furnace dust containing 13% Sn and after the bath becomes thinly fluid it is treated for 35 minutes with hydrogen. The total charge thus contained 23.9 kgs. Sn. After the treatment 46.2 kgs. of metal containing 46% Sn=21.27 kgs. Sn was obtained. The slag still contained 0.72%

Sn. The separated metal had the following composition:

Sn 46.00%   Pb 19.82%
Cu 12.00%   Sb 12.40%

The consumption of hydrogen amounted to 18 cubic metres.

What I claim is:—

1. A process for recovering non-ferrous metals from material containing an oxide of at least one of the metals copper, nickel, tin, lead, bismuth and antimony, which comprises melting said material, passing reducing gases through said molten material while heating it in a furnace in which the heating gases are introduced into the interior thereof from above the surface of the melt, and regulating the interaction between said reducing gases and the combustion gases in such a manner that a neutral to slightly reducing atmosphere obtains at the surface of the melt, whereby are recovered—as far as originally present in the material treated—copper and nickel wholly, and tin, lead, bismuth, antimony at least partly in a reguline form.

2. A process for recovering non-ferrous metals from material containing an oxide of at least one of the metals copper, nickel, tin, lead, bismuth and antimony, which comprises melting said material, passing reducing gases through said molten material while heating it in an internally heated furnace, regulating the interaction between said reducing gases and the combustion gases at first in such a manner that a neutral to slightly reducing atmosphere obtains at the surface of the melt, whereby are recovered—as far as originally present in the material treated—, copper and nickel wholly and tin, lead, bismuth, antimony at least partly in a reguline form, then removing these metals and thereupon regulating the interaction between said reducing gases and the combustion gases in such a manner that an oxidizing atmosphere obtains at the surface of the melt so as to volatilize the remaining metal content of the melt, such as tin, lead, antimony, bismuth, as oxide.

3. A process for recovering non-ferrous metals from material containing an oxide of at least one of the metals copper, nickel, tin, lead, bismuth and antimony, which comprises melting said material, passing reducing gases through said molten material while heating it in an internally heated furnace, regulating the interaction between said reducing gases and the combustion gases at first in such a manner that a neutral to slightly reducing atmosphere obtains at the surface of the melt, whereby are recovered—as far as originally present in the materials treated—copper and nickel wholly and tin, lead, bismuth, antimony at least partly in a reguline form, then removing these metals, and thereupon adding sulphur-yielding substances to said melt and regulating the interaction between said reducing gases and the combustion gases in such a manner that an oxidizing atmosphere obtains at the surface of the melt so as to volatilize the remaining metal content of the melt, such as tin, lead, antimony, bismuth, as oxide.

4. A process for recovering non-ferrous metals from material containing an oxide of at least one of the metals copper, nickel, tin, lead, bismuth and antimony, which comprises melting said material, adding thereto a substance such as flue dust containing metal oxide to be dissolved in the melt, passing reducing gases through said molten material while heating it in a furnace in which the heating gases are introduced into the interior thereof from above the surface of the melt, and regulating the interaction between said reducing gases and the combustion gases in such a manner that a neutral to slightly reducing atmosphere obtains at the surface of the melt, whereby are recovered—as far as originally present in the material treated,—copper and nickel wholly and tin, lead, bismuth, antimony at least partly in a reguline form.

5. A process for recovering non-ferrous metals from material containing an oxide of at least one of the metals copper, nickel, tin, lead, bismuth and antimony, which comprises melting said material, adding thereto a substance such as flue dust containing metal oxide, passing reducing gases through said molten material while heating it in an internally heated furnace, and regulating the interaction between said reducing gases and the combustion gases in such a manner that a neutral to slightly reducing atmosphere obtains at the surface of the melt, whereby are recovered as far as originally present in the material treated—, copper and nickel wholly and tin, lead, bismuth, antimony at least partly in a reguline form, then removing these metals and thereupon regulating the interaction between said reducing gases and the combustion gases in such a manner that an oxidizing atmosphere obtains at the surface of the melt so as to volatilize the remaining metal content of the melt, such as tin, lead, antimony, bismuth, as oxide.

6. A process for recovering non-ferrous metals from material containing an oxide of at least one of the metals copper, nickel, tin, lead, bismuth and antimony, which comprises melting said material, passing preheated reducing gases through said molten material while heating it in a furnace in which the heating gases are introduced into the interior thereof from above the surface of the melt, and regulating the interaction between said reducing gases and the combustion gases in such a manner that a neutral to slightly reducing atmosphere obtains at the surface of the melt, whereby are recovered—as far as originally present in the material treated—copper and nickel wholly and tin, lead, bismuth, antimony at least partly in a reguline form.

7. A process for recovering non-ferrous metals from material containing an oxide of at least one of the metals, copper, nickel, tin, lead, bismuth and antimony, which comprises melting said material, passing preheated reducing gases through said molten material while heating it in an internally heated furnace, regulating the interaction between said reducing gases and the combustion gases at first in such a manner that a neutral to slightly reducing atmosphere obtains at the surface of the melt, whereby are recovered, as far as originally present in the material treated, copper, and nickel wholly and tin, lead, bismuth, antimony at least partly in a reguline form, then removing these metals and thereupon regulating the interaction between said reducing gases and the combustion gases in such a manner that an oxidizing atmosphere obtains at the surface of the melt so as to volatilize the remaining metal content of the melt, such as tin, lead, antimony, bismuth, as oxide.

WILHELM WITTER.